(12) United States Patent
Cunningham

(10) Patent No.: US 10,894,494 B2
(45) Date of Patent: Jan. 19, 2021

(54) RETRACTABLE GAP BLOCKER FOR CENTER CONSOLE

(71) Applicant: Toyota Motor Engineering & Manufacturing North America, Inc., Plano, TX (US)

(72) Inventor: James D. Cunningham, Clarkston, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 79 days.

(21) Appl. No.: 16/364,954

(22) Filed: Mar. 26, 2019

(65) Prior Publication Data
US 2020/0307427 A1   Oct. 1, 2020

(51) Int. Cl.
*B60N 2/60* (2006.01)

(52) U.S. Cl.
CPC ................... *B60N 2/6009* (2013.01)

(58) Field of Classification Search
None
See application file for complete search history.

(56) References Cited

U.S. PATENT DOCUMENTS

| | | | | |
|---|---|---|---|---|
| 4,948,195 A * | 8/1990 | Saunders | ............... | B60N 2/91 297/182 |
| 8,056,970 B1 * | 11/2011 | Phillips | ............... | B60N 2/6009 297/182 |
| D741,248 S * | 10/2015 | Boss | ............... | D12/422 |
| 9,272,669 B2 * | 3/2016 | Demos | ............... | B60R 7/043 |
| 9,446,698 B2 * | 9/2016 | Ushiyama | ............... | B64D 11/06 |
| 9,701,233 B1 | 7/2017 | Farooq et al. | | |
| 10,647,225 B2 * | 5/2020 | Morita | ............... | B60N 2/20 |
| 2007/0108787 A1 * | 5/2007 | Dohan | ............... | B60N 2/6009 296/37.15 |
| 2007/0241581 A1 * | 10/2007 | Martin | ............... | B60N 3/00 296/37.8 |
| 2008/0283565 A1 * | 11/2008 | Simon | ............... | B60R 11/00 224/542 |
| 2009/0134688 A1 * | 5/2009 | Waltman | ............... | B60N 3/101 297/463.2 |
| 2009/0224563 A1 * | 9/2009 | Gregory | ............... | B60R 11/00 296/1.07 |
| 2011/0266820 A1 | 11/2011 | Hurwitz | | |
| 2012/0242115 A1 * | 9/2012 | Schreiber | ............... | B60N 2/24 297/180.12 |
| 2013/0334845 A1 | 12/2013 | Fung | | |

FOREIGN PATENT DOCUMENTS

WO   2014110320 A1   7/2014

* cited by examiner

*Primary Examiner* — Lori L Lyjak
(74) *Attorney, Agent, or Firm* — Christopher G. Darrow; Darrow Mustafa PC

(57) ABSTRACT

A gap blocker assembly for a vehicle is provided. The gap blocker assembly includes a passage extending through an outer wall of a vehicle center console. A gap blocker resides in the passage and is configured to be positionable in an extended position in which the gap blocker extends from the passage past the outer wall to an exterior of the console. The gap blocker is also configured to be positionable in a retracted position in which the gap blocker does not extend past the outer wall.

9 Claims, 3 Drawing Sheets

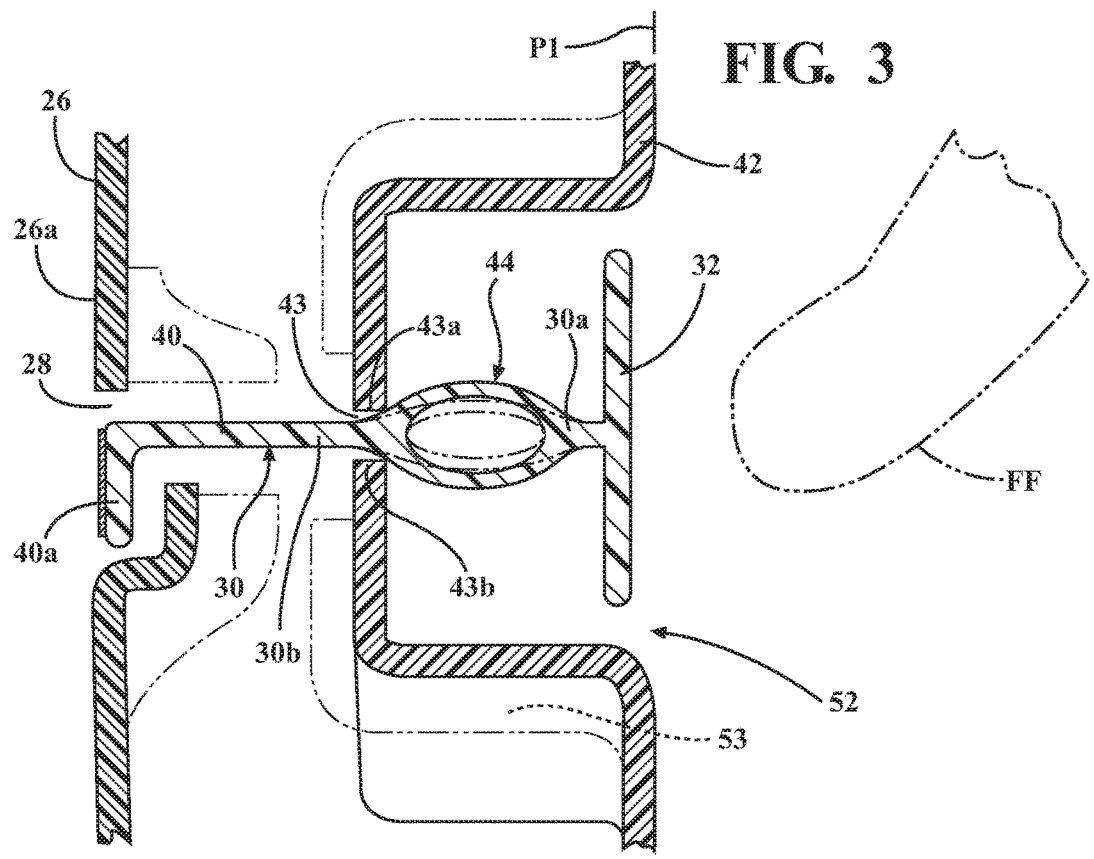
FIG. 3
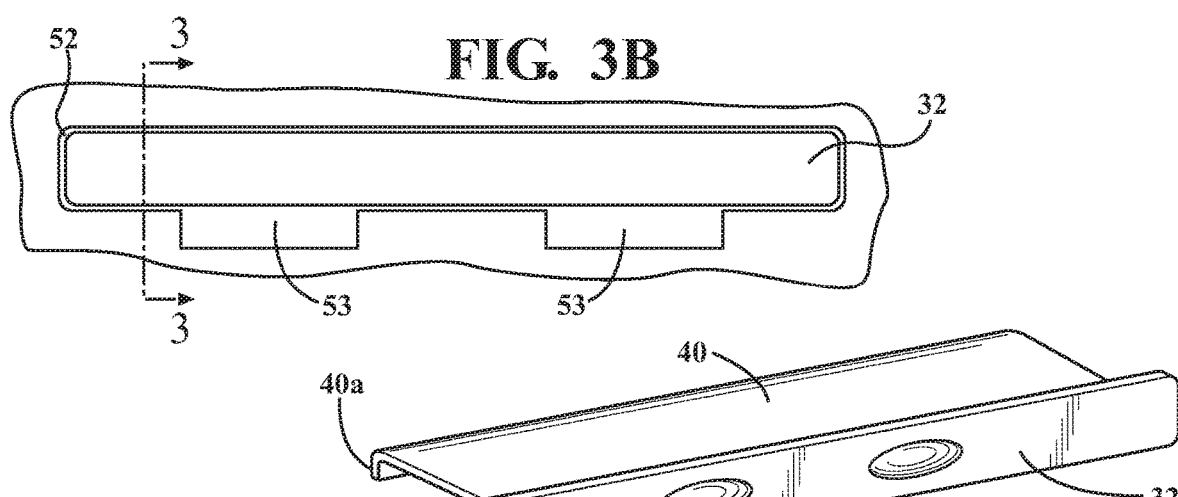
FIG. 3B
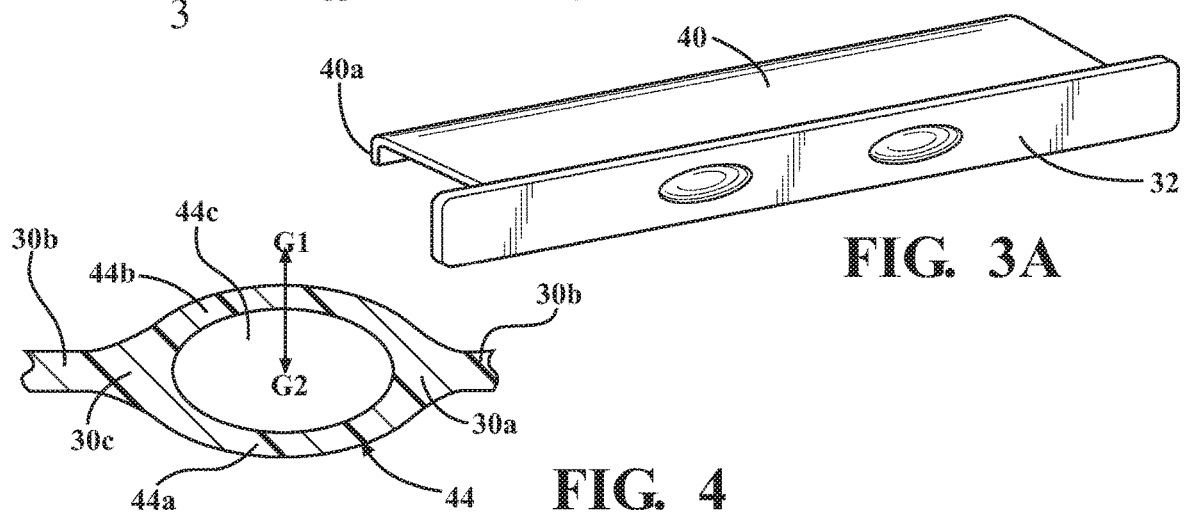
FIG. 3A
FIG. 4

RETRACTABLE GAP BLOCKER FOR CENTER CONSOLE

TECHNICAL FIELD

The present invention relates to vehicle interiors and, more particularly, to an assembly configured for preventing an object from falling into a gap between a front seat of a vehicle and a center console of the vehicle.

BACKGROUND

In vehicles, gaps may exist between a driver seat and a center console adjacent the driver seat, and also between a front passenger seat and the center console. Object, such as keys, loose change, a wallet, a cellular device, etc. may fall into these gaps. The gaps may be wide enough to admit such objects, yet too narrow to permit a user to insert a hand into the gap and grasp and retrieve the object.

SUMMARY

In one aspect of the embodiments described herein, a gap blocker assembly for a vehicle is provided. The gap blocker assembly includes a passage extending through an outer wall of a vehicle center console. A gap blocker resides in the passage and is configured to be positionable in an extended position in which the gap blocker extends from the passage past the outer wall to an exterior of the console. The gap blocker is also configured to be positionable in a retracted position in which the gap blocker does not extend past the outer wall.

In another aspect of the embodiments described herein, a vehicle includes a center console having an outer wall positioned opposite a seat of the vehicle and defining an interior of the center console. A gap blocker is positioned in the center console interior. The gap blocker is configured to be positionable in an extended position in which the gap blocker extends from the outer wall to contact the vehicle seat to span a gap between the outer wall and the vehicle seat. The gap blocker is also configured to be positionable in a retracted position in which the gap blocker does not span a gap between the outer wall and the vehicle seat.

BRIEF DESCRIPTION OF THE DRAWINGS

FIG. 3 is a magnified view of a portion of the rear cross-sectional view of the center console shown in FIG. 2, showing a gap blocker of the gap blocker assembly positioned in a retracted position.

FIG. 3A is a perspective view of a gap blocker in accordance with an embodiment described herein.

FIG. 3B is a view of the gap blocker of FIG. 3A mounted in a wall of the center console, as viewed from the interior of the console.

FIG. 4 is a magnified view of a portion of the view shown in FIG. 3, showing one embodiment of a detent portion of the gap blocker.

DETAILED DESCRIPTION

Figure 1:
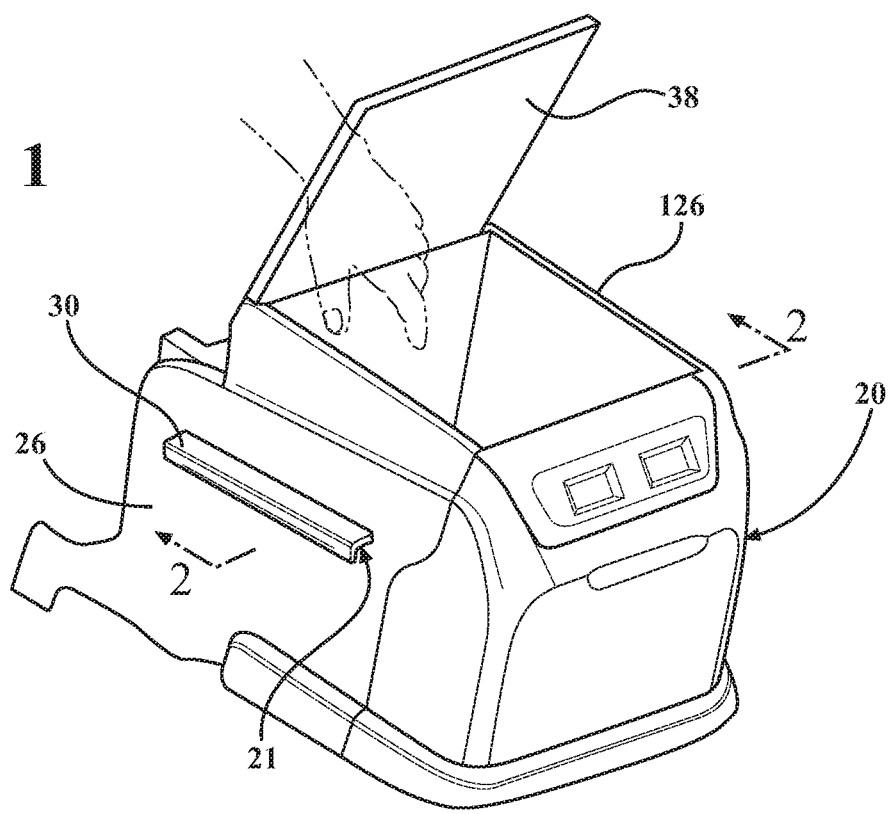
FIG. 1 is a perspective view of a vehicle center console incorporating a gap blocker assembly in accordance with an embodiment described herein, with the gap blocker shown in an extended position.

Embodiments described herein relate to a gap blocker assembly for a vehicle. The gap blocker assembly includes a passage extending through an outer wall of a vehicle center console. A gap blocker resides in the passage and is configured to be positionable in an extended position in which the gap blocker extends from the passage past the outer wall to an exterior of the console. When in the extended position, the gap blocker blocks a gap between the center console and a vehicle seat, to prevent objects from falling deep into the gap formed between the console and seat. A user may move the gap blocker from the retracted position to the extended position by reaching into the center console and pushing the gap blocker in a direction toward the seat. The gap blocker is also configured to be positionable in a retracted position in which the gap blocker does not extend past the console outer wall. When in the retracted position, the gap blocker is contained within the center console. A user may move the gap blocker from the extended position to the retracted position by reaching into the center console and pulling the gap blocker in a direction away from the seat.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 2:
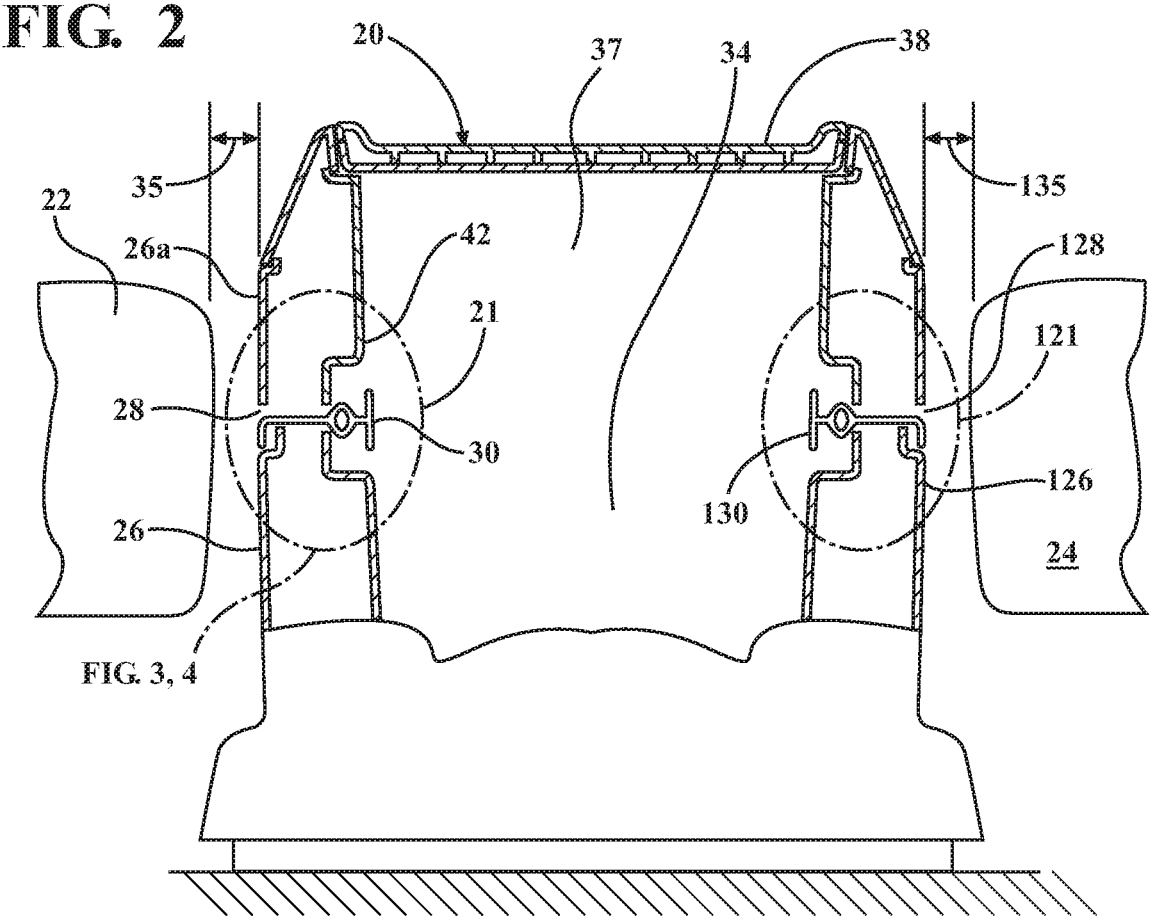
FIG. 2 is a rear cross-sectional view of the center console shown in FIG. 1.

FIG. 1 is a perspective view of a vehicle center console 20 incorporating a gap blocker assembly (generally designated 21) in accordance with an embodiment described herein. FIG. 2 is a rear cross-sectional view of the center console 20 shown in FIG. 1. FIG. 3 is a magnified view of a portion of the rear cross-sectional view of the center console 20 shown in FIG. 2, showing a gap blocker 30 of the gap blocker assembly 21 positioned in a retracted position. As known in the pertinent art, center console 20 may be positioned between driver seat 22 and a front passenger seat 24 of the vehicle. Although the elements and operating characteristics of the gap blocker assembly 21 will be described herein in relation to the driver seat 22, it will be understood that similar elements of another gap blocker assembly 121 may be incorporated (in inverted or "mirror image" form) into the center console 20 proximate the front passenger seat 24, as shown in FIG. 2. That is, it will be understood from the drawings that the structure and operation of the gap blocker assembly 121 in FIG. 2 is the same as the structure and operation of the gap blocker 21 as described herein and will not be described separately in detail, except that the gap blocker assembly 121 operates as a "mirror-image" of gap blocker 21. Gap blocker 30 may be formed from a polymer material or any other material suitable for the purposes described herein.

Referring to the drawings, the center console 20 may include an outer wall 26 positioned opposite the vehicle driver seat 22 and another outer wall 126 positioned opposite the front passenger seat 24. A passage 28 may extend through the outer wall 26 and a similar passage 128 may extend through the outer wall 126. A gap 35 may exist between the driver seat 22 and the console 20 and a similar gap 135 may exist between the front passenger seat 24 and the console 20. A gap blocker 30 may be positioned in the passage 28 and an identical gap blocker 130 may be positioned in the passage 128. The gap blocker 30 may be configured to be positionable in a retracted position (shown in FIGS. 2 and 3) in which the gap blocker 30 does not extend past an outer surface 26*a* of the outer wall 26. The gap blocker 30 may also be configured to be positionable in an extended position (shown in FIG. 5) in which the gap blocker 30 extends from the passage 28 past the outer surface 26*a* of the outer wall 26 to an exterior of the console 20, to contact the driver seat 22. The gap blocker 130 may be similarly positionable in associated retracted and extended positions.

Referring to FIGS. 2 and 3, the gap blocker 30 may include an actuation portion 32 residing in an interior 34 of the center console 20 and operable to enable movement of the gap blocker 30 between the retracted position and the extended position. The center console 20 may have an opening 37 in the top of the console enabling access to the interior 34 of the center console. A hinged lid 38 may be operatively coupled to the outer walls 26, 126 to enable the center console interior 34 to be closed and opened for access thereto. For purposes described herein, the interior 34 of the center console includes any portion of the center console that resides within a space defined by the outer walls 26, 126 and the lid 38 when the lid is closed.

The gap blocker 30 may also include a gap blocking portion 40 operably coupled to the actuation portion 32 and configured to extend from the passage 28 past the outer wall 26 to the exterior of the console 20 so as to contact the driver seat 22 when the gap blocker 30 is in the extended position. Gap blocking portion 40 may have an end 40*a* structured to contact the seat 22. End 40*a* may be structured to be flush with an outer surface 26*a* of console wall 26 residing opposite seat 22 when the gap blocker 30 is in the retracted position. Alternatively, the end 40*a* may be structured to be recessed (i.e., non-coplanar) with respect to surface 26*a*, in a direction toward the interior 34 of the console when the gap blocker 30 is in the retracted position.

The center console 20 may also include an inner wall 42 positioned opposite and spaced apart from the outer wall 26. The inner wall 42 may face the interior 34 of the console 20. An opening 43 may be provided in the inner wall 42 to form a portion of passage 28. Thus, the passage 28 and portions of the gap blocker 30 may extend through the inner wall 42, between inner wall 42 and the outer wall 26, and past inner wall 42 farther into the console interior 34.

Referring to FIGS. 3 and 3A, the inner wall 42 may define a first recess 52 structured to receive therein the actuation portion 32 and detent portion 44 when the gap blocker 30 is in the retracted position. The first recess 52 may be structured to receive the actuation portion 32 and detent portion 44 such that the actuation portion 32 and detent portion 44 are either coplanar with a plane P1 of the inner wall 42 or are spaced apart from the plane P1 in a direction toward the outer wall 26 when the gap blocker is in the retracted position.

Figure 6:
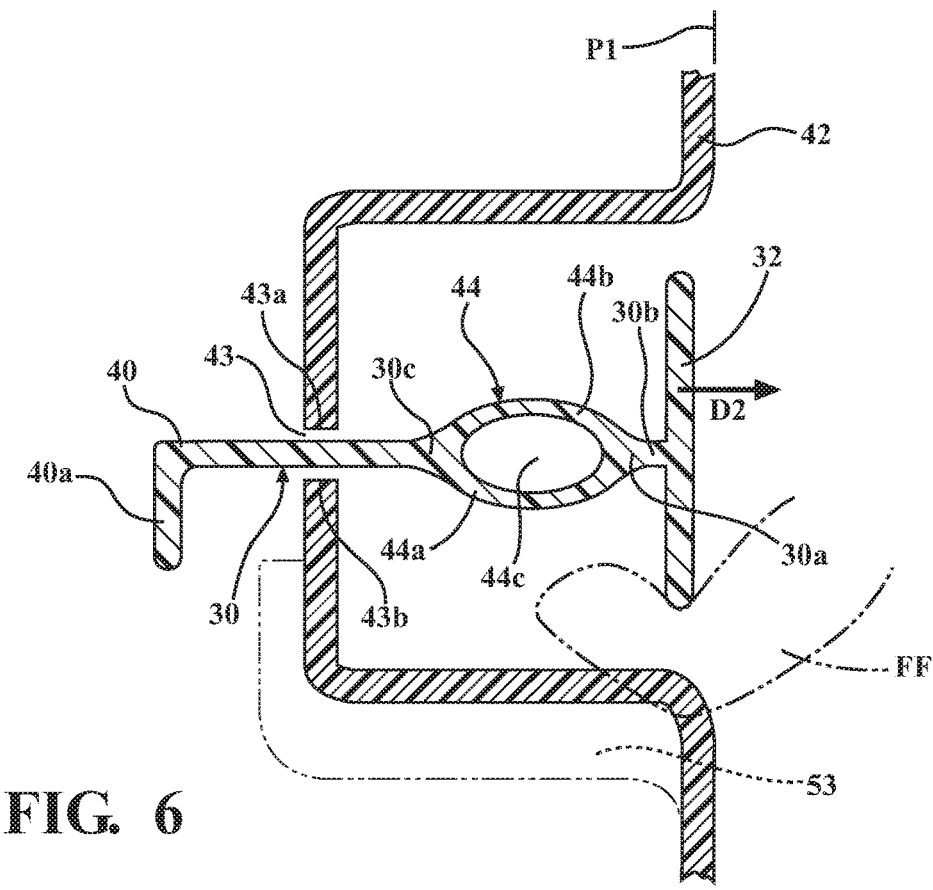
FIG. 6 is the view of FIG. 3 showing movement of the gap blocker from the extended position back to a retracted position.

In one or more locations, the inner wall 42 may also define a second recess 53 which may combine with the recess 52 to enable a finger of a user to be inserted into recess 53 and behind the actuation portion 32 as shown in FIG. 6 to enable the user to pull the gap blocker 30 in direction D2, thereby moving the gap blocker 30 from the extended position to the retracted position.

The gap blocker 30 may also include a detent portion 44 interposed between the actuation portion 32 and the gap blocking portion 40. The detent portion 44 may be structured to reside in the recess 52 when the gap blocker 30 is in the retracted position. In addition, the detent portion 44 may be structured to maintain the gap blocker 30 in the retracted position when the detent portion 44 resides in the recess 52. The detent portion 44 may also be structured to reside between the inner wall 42 and the outer wall 26 when the gap blocker 30 is in the extended position, and may be structured to maintain the gap blocker 30 in the extended position when the detent portion 44 resides between the inner wall 42 and the outer wall 26.

Detent portion 44 may be structured to be resiliently deformable. In one or more arrangements, detent portion 44 may bifurcate at a location 30*a* from a base 30*b* of the gap blocker 30 connecting actuation portion 32 with detent portion 44 into a pair of opposed legs 44*a* and 44*b* which reconnect at another location 30*c* on the base 30*b*. Legs 44*a*, 44*b* may combine to define a void 44*c* into which legs 44*a*, 44*b* may resiliently deflect in directions G1 and G2 as indicated by the phantom lines in FIG. 3 during movement of the gap blocker 30 between the extended position and the retracted position. In particular arrangements, void 44*c* may be generally elliptical in shape. The portion of the inner wall 42 defining the recess 52 may have opening 43 formed therein. Detent legs 44*a*, 44*b* may be structured to be resiliently deformable responsive to contact with edges 43*a*, 43*b* of the inner wall opening 43.

Figure 5:
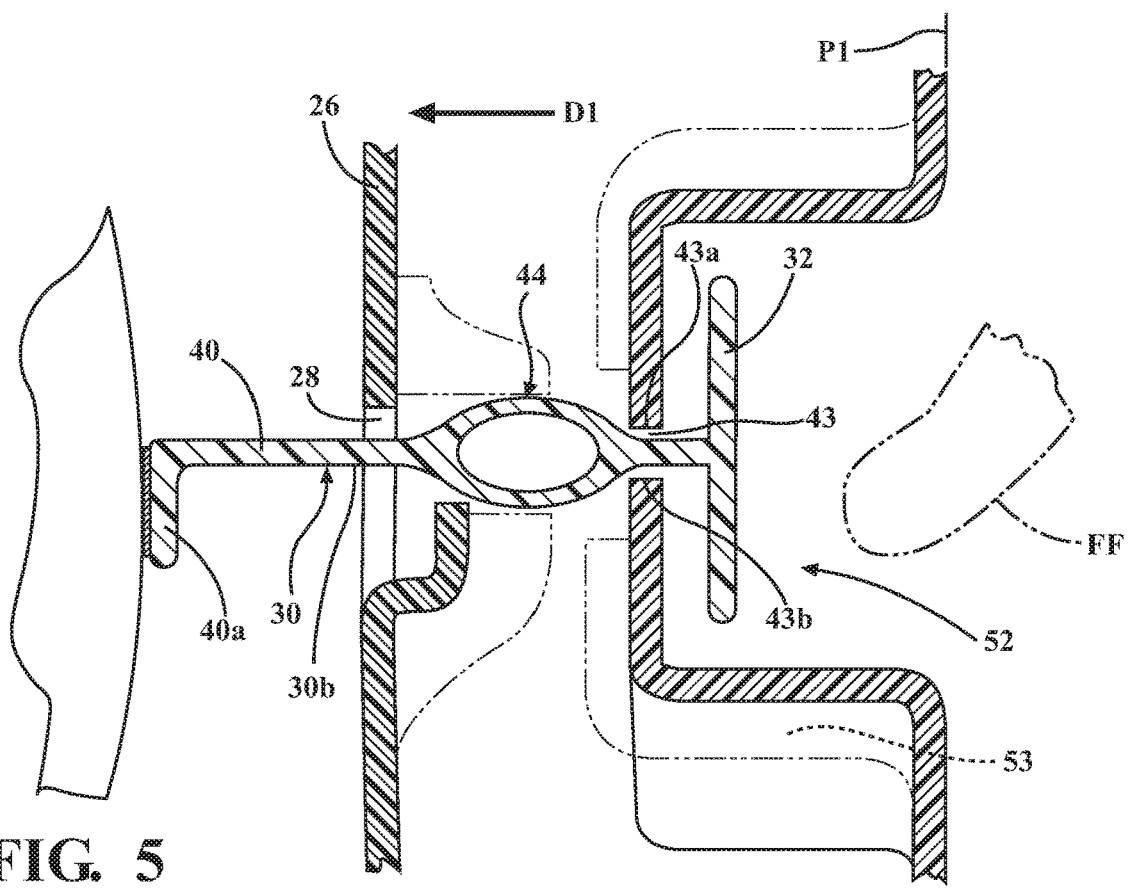
FIG. 5 is the view of FIG. 3 showing movement of the gap blocker to an extended position.

Referring to FIG. 5, to move the gap blocker 30 from the retracted position to the extended position, a user may reach a finger FF into the console interior 34 through the console top opening 37 and push the actuation portion 32 in direction D1. The detent portion 44 may be positioned along base 30*b* in relation to inner wall 42 such that the location 30*c* resides at the inner wall opening 43 when the gap blocker 30 is in the retracted position. This may prevent the detent portion 44 from passing through the opening 43 when the gap blocker 30 is in the retracted position, until the gap blocker 30 is pushed and extended by the user. The gap blocking portion 40 is thereby maintained in the retracted position.

When the user pushes the detent portion 44 through the opening 43 during movement of the gap blocker 30 from the retracted position to the extended position, each of the detent portion legs 44*a*, 44*b* may resiliently deflect in a direction toward void 44*c* responsive to contact with edges 43*a*, 43*b* of the inner wall opening 43, to enable the detent portion to fit through the opening. The legs 44*a*, 44*b* may deflect in a similar manner as the detent portion is forced through the opening 43 during movement of the gap blocker 30 from the extended position to the retracted position.

The detent portion 44 may alternatively be positioned along base 30*b* in relation to inner wall 42 such that a small portion of the detent portion 44 resides within the opening 43 when the gap blocker 30 is in the retracted position, in which case the detent portion legs 44*a*, 44*b* may be slightly deflected and may therefore exert a reaction force on the gap blocker 30 which maintains the gap blocker in the retracted position. Until the gap blocker 30 is pushed by the user, the undeflected state of the detent portion 44 then prevents the detent portion from entering opening 43, thereby maintaining the gap blocker 30 in the retracted position.

Pushing the gap blocker in direction D1 toward the extended position forces the detent portion 44 into the opening 43, wherein leg 44*a* resiliently deflects in direction G1 and leg 44*b* resiliently deflects in direction G2 in order for the detent portion 44 to fit through the opening 43.

Pushing the gap blocker toward the extended position also forces the gap blocking portion 40 to exit the passage 28 and proceed in direction D1 until it contacts the driver seat 22, at which point the gap 35 between the console 20 and the driver seat 22 is blocked by the gap blocking portion 40. After the detent portion 44 has been moved through the opening 43, the legs 44a, 44b revert to their undeflected conditions as shown in FIG. 5.

The detent portion 44 may be positioned along base 30b in relation to inner wall 42 such that the location 30a resides at the opening 43 when the gap blocker 30 is in the extended position. This may prevent the detent portion 44 from passing back through the opening 43 when the gap blocking portion 40 is in contact with the seat 22, until the gap blocker 30 is retracted by the user. The gap blocking portion 40 is thereby maintained in a position to block the gap 35. The detent portion 44 may alternatively be positioned along base 30b in relation to inner wall 42 such that a small portion of the detent portion 44 still resides within the opening 43 when the gap blocker 30 is in the extended position, in which case the detent portion legs 44a, 44b will still be slightly deflected and will therefore exert a reaction force on the gap blocker 30 which maintains the gap blocking portion 40 in contact with the seat 22.

Referring to FIG. 6, to move the gap blocker 30 from the extended position to the retracted position, a user may position finger FF behind the actuation portion 32 as shown and pull the actuation portion 32 in direction D2, thereby pulling detent portion 44 back through the opening 43 and pulling the gap blocking portion 40 away from the seat 22 in a reversal of the process just described for moving the gap blocker 30 to the extended position.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A gap blocker assembly for a vehicle, comprising:
    a passage extending through an outer wall of a vehicle center console; and
    a gap blocker residing in the passage and configured to be positionable in an extended position in which the gap blocker extends from the passage past the outer wall to an exterior of the center console, and positionable in a retracted position in which the gap blocker does not extend past the outer wall.

2. The gap blocker assembly of claim 1 wherein the gap blocker includes an actuation portion residing in an interior of the center console and operable to enable movement of the gap blocker between the retracted position and the extended position.

3. The gap blocker assembly of claim 2 wherein the gap blocker includes a gap blocking portion operably coupled to the actuation portion and configured to extend from the passage past the outer wall to the exterior of the center console when the gap blocker is in the extended position.

4. The gap blocker assembly of claim 3 wherein the center console includes an inner wall spaced apart from the outer wall and facing an interior of the center console, wherein the passage extends through the inner wall and between inner wall and the outer wall.

5. The gap blocker assembly of claim 4 further comprising a detent portion interposed between the actuation portion and the gap blocking portion and structured to be resiliently deformable responsive to contact with the inner wall.

6. The gap blocker assembly of claim 5 wherein the detent portion is structured to reside between the inner wall and the outer wall when the gap blocker is in the extended position, and wherein the detent portion is structured to maintain the gap blocker in the extended position when the detent portion resides between the inner wall and the outer wall.

7. The gap blocker assembly of claim 5 wherein the inner wall defines a recess, wherein the detent portion is structured to reside in the recess when the gap blocker is in the retracted position, and wherein the detent portion is structured to maintain the gap blocker in the retracted position when the detent portion resides in the recess.

8. The gap blocker assembly of claim 2 wherein the center console has an opening enabling access to an interior of the center console, and wherein the gap blocker is structured to be actuated by a user reaching into the center console interior and contacting the actuation portion.

9. A vehicle comprising:
    a center console having an outer wall positioned opposite a seat of the vehicle and defining an interior of the center console; and
    a gap blocker positioned in the center console interior, the gap blocker being configured to be positionable in an extended position in which the gap blocker extends from the outer wall to contact the vehicle seat to span a gap between the outer wall and the vehicle seat, and a retracted position in which the gap blocker does not span a gap between the outer wall and the vehicle seat.

* * * * *